US010614217B2

(12) United States Patent
Modave et al.

(10) Patent No.: US 10,614,217 B2
(45) Date of Patent: Apr. 7, 2020

(54) SCRAMBLING OF THE OPERATION OF AN INTEGRATED CIRCUIT

(71) Applicants: STMICROELECTRONICS (ROUSSET) SAS, Rousset (FR); PROTON WORLD INTERNATIONAL N.V., Diegem (BE)

(72) Inventors: Jean-Louis Modave, Ottignies (BE); Fabrice Marinet, Chateauneuf le Rouge (FR); Michael Peeters, Tourinnes-la-Grosse (BE)

(73) Assignees: STMICROELECTRONICS (ROUSSET) SAS, Rousset (FR); PROTON WORLD INTERNATIONAL N.V., Diegem (BE)

( * ) Notice: Subject to any disclaimer, the term of this patent is extended or adjusted under 35 U.S.C. 154(b) by 216 days.

(21) Appl. No.: 15/659,445

(22) Filed: Jul. 25, 2017

(65) Prior Publication Data
US 2018/0150634 A1 May 31, 2018

(30) Foreign Application Priority Data

Nov. 28, 2016 (FR) ...................... 16 61562

(51) Int. Cl.
*G06F 21/55* (2013.01)
*G06F 21/75* (2013.01)
*H04L 9/00* (2006.01)
*G06F 21/76* (2013.01)
*G06F 21/72* (2013.01)

(52) U.S. Cl.
CPC ............ *G06F 21/556* (2013.01); *G06F 21/72* (2013.01); *G06F 21/75* (2013.01); *G06F 21/755* (2017.08); *G06F 21/76* (2013.01); *H04L 9/002* (2013.01); *H04L 2209/043* (2013.01); *H04L 2209/08* (2013.01)

(58) Field of Classification Search
None
See application file for complete search history.

(56) References Cited

U.S. PATENT DOCUMENTS

| | | | | |
|---|---|---|---|---|
| 8,321,691 | B2 * | 11/2012 | Romain | G06F 7/723 713/194 |
| 2009/0010424 | A1 * | 1/2009 | Qi | G06F 7/723 380/28 |
| 2011/0176678 | A1 * | 7/2011 | Choi | H04L 9/0631 380/259 |
| 2011/0258459 | A1 * | 10/2011 | Guilley | G06F 21/75 713/189 |
| 2011/0285421 | A1 | 11/2011 | Deas et al. | |

(Continued)

*Primary Examiner* — Kaveh Abrishamkar
(74) *Attorney, Agent, or Firm* — Seed IP Law Group LLP

(57) ABSTRACT

An integrated circuit includes functional circuitry such as a processing core, memory interfaces, cryptographic circuitry, etc. The integrated circuit also includes protection circuitry to protect the functional circuitry of the integrated circuit against attacks by hidden channels. The protection circuitry, for each of a series of successive periods of time, selects a configuration of the functional circuitry from a set of configurations of the functional circuitry, sets a duration of the period of time, and applies the selected configuration of the functional circuitry for the set duration of the period of time.

34 Claims, 2 Drawing Sheets

(56) References Cited

U.S. PATENT DOCUMENTS

| | | |
|---|---|---|
| 2011/0296198 A1 | 12/2011 | Motoyama |
| 2013/0064362 A1 | 3/2013 | Tang et al. |
| 2016/0127123 A1* | 5/2016 | Johnson .................. H04L 9/003 713/189 |
| 2017/0033923 A1* | 2/2017 | Melzani .................. H04L 9/003 |
| 2018/0323958 A1* | 11/2018 | Courtney ................ H04L 9/003 |

* cited by examiner

SCRAMBLING OF THE OPERATION OF AN INTEGRATED CIRCUIT

BACKGROUND

Technical Field

The present description generally relates to electronic circuits and, more specifically, to circuits executing operations which are intended to be masked.

Description of the Related Art

Integrated circuits may include circuits or "secret" pieces of information which are considered sensitive in view of the security of the data that they are processing, such as authentication keys, signatures, etc., or algorithms that they use, such as encryption or decryption algorithms. Such information should not be communicated nor be detectable by third parties or by unauthorized circuits.

The analysis techniques for analyzing the operation of an integrated circuit are increasingly effective and hackers enjoy increasingly advanced analysis techniques. In particular, attacks by hidden channels (analyzing the consumption of the circuit, its electromagnetic radiation, etc.) are increasingly effective. Among these attacks, "time attacks" (synchronization attacks) seek to detect specific instants of operation of a processing unit in order to be able to subsequently temporally slot in other attacks.

BRIEF SUMMARY

One embodiment facilitates addressing all or part of the drawbacks of the known techniques for protecting information handled by an integrated circuit.

One embodiment provides a countermeasure against time attacks.

One embodiment provides for a method for protecting at least one function of an integrated circuit against attacks by hidden channels, in which a configuration of the function is regularly modified, a current configuration being chosen from among a set of configurations and the application duration of the different configurations changing from one configuration to another.

According to one embodiment, the selection of the configurations is sequential.

According to one embodiment, the selection of the current configuration is random.

According to one embodiment, a piece of selection information is combined with a mask randomly chosen for supplying the selection of the current configuration.

According to one embodiment, the mask changes each time that all the configurations have been used with the current mask.

According to one embodiment, the selection of the application duration also depends on the mask.

One embodiment provides for a protection module for protecting at least one function of an integrated circuit, comprising:

a selector of a piece of configuration information on the function from among multiple different configurations; and a control circuit for controlling the selector, in which the selection of the configuration applied to the function regularly changes and the application duration of the different configurations changes from one configuration to another.

According to one embodiment, the application duration is selected in a stored table of application durations. In an embodiment, a number of the application durations is the same number as the number of configurations.

According to one embodiment, the different pieces of configuration information are stored in registers.

According to one embodiment, the module is inserted in the path of a configuration signal of the function.

According to one embodiment, the function is a countermeasure against an analysis of the consumption of the circuit by hidden channels.

According to one embodiment, the function is the clock of a processing unit of the integrated circuit.

According to one embodiment, the configuration modifies the sequencing of the operations of the function.

BRIEF DESCRIPTION OF THE SEVERAL VIEWS OF THE DRAWINGS

These features and advantages, as well as others, will be disclosed in detail in the following description of specific embodiments given non-restrictively in relation to the attached figures among which.

DETAILED DESCRIPTION

The same elements have been designated by the same references in the different figures, unless the context indicates otherwise.

For the sake of clarity, only the steps and elements useful for understanding the embodiments that will be described have been represented and will be given in detail. In particular, other aspects, such as the specific calculation functions performed, have not been described in detail, since it will be clear to the person skilled in the art that the embodiments described here can be applied to a wide range of calculation functions, for cryptographic applications or other types of applications.

Figure 1:
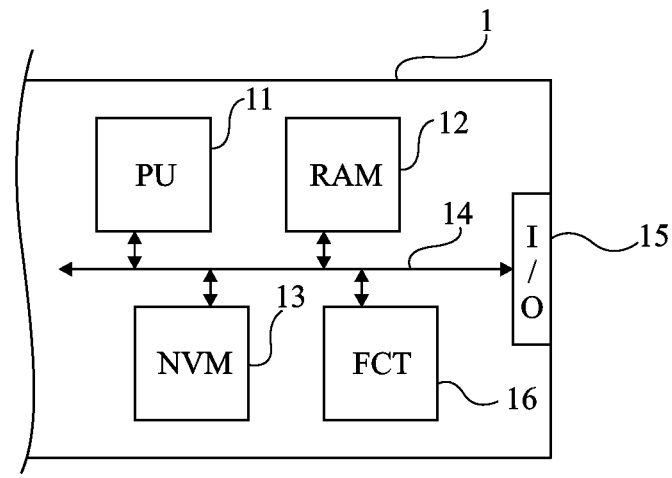
FIG. 1 represents, very schematically and in the form of blocks, an embodiment of an electronic circuit of the type to which, by way of example, the described embodiments apply.

FIG. 1 represents, very schematically and in the form of blocks, an embodiment of an electronic circuit 1 of the type to which, by way of example, the embodiments which will be described apply.

The circuit 1 comprises:

one or more processing units or IP cores 11 (PU), e.g., a state machine, a microprocessor, a programmable logic circuit, etc., and various combinations thereof;

one or more volatile storage areas 12 (RAM), e.g., RAM memory or registers, for temporarily storing information (instructions, addresses, data) during processing;

one or more non-volatile storage areas 13 (NVM) (e.g., flash type memory) for storing information in a sustainable manner and in particular when the circuit is not powered;

one or more data, address and/or command buses 14 between the different elements internal to the circuit 1; and one or more input-output interfaces 15 (I/O), e.g., serial buses, for communicating with the exterior of the circuit 1. Where applicable, the circuit 1 also incorporates one or more communication circuits, such as a contactless communication circuit (CLF—ContactLess Front-end), of the Near Field Communication (NFC) type.

Furthermore, the circuit 1 may incorporate other functions according to the application, e.g., a crypto-processor, other interfaces, other memories, etc., symbolized by a block or circuit 16 (FCT) in FIG. 1.

The activity of the circuit 1 may be expressed in variations of the current consumed and electromagnetic radiation generated by the operation. These variations are capable of supplying information on certain processing carried out by the circuit and notably on the instants of this processing. The exploitation of these traces of activity by time attacks makes it possible to identify specific operations, e.g., write operations in flash memory, and thereafter to target other attacks making it possible to penetrate the secrets handled by the circuit.

Solutions desynchronizing the operation of an electronic circuit have already been provided. Hardware solutions introducing fictitious operating cycles in the processor allow a time offset (jitter) in sensitive operations from one execution to another. However, these offsets remain local to the processor and may prove ineffective against the new analysis techniques for analyzing consumption and radiation which make it possible to monitor the variations in memory accesses, for example. Software solutions generate interrupts using the code (program) for desynchronizing operations. However, such solutions may be incompatible with the storage of the code and data in flash memories since these interrupts determined by the code stored in flash memory would cause address conflicts with data write and erasure operations in this memory.

The embodiments described provide for an additional hardware module or circuitry, inserted in the path of a configuration signal of at least one hardware function (typically a module of the circuit, e.g., its processing unit or IP core, its memory interface, etc.), in order to regularly modify this configuration. Intervening on the signal leads, directly or indirectly, to a scrambling or a desynchronization of the operations of the hardware function concerned. In an embodiment, according to the function concerned, the circuitry modifies the parameterization or the sequencing of this function.

For example, the signal is the clock signal of the processing unit and the function is this processing unit itself.

According to another example, the signal is a configuration signal of the clock signal of the processing unit and the function is the processing unit. The configuration signal corresponds, for example, to setting a percentage to be applied to the clock signal for modifying the period.

According to another embodiment, in which a countermeasure comprises inserting dummy instructions in an instruction stream carried on a bus, the signal is a configuration signal of the number or the percentage of dummy instructions sent on the bus, which desynchronizes the operations of the circuit receiving the dummy instructions, e.g., a processing unit, a memory controller, a peripheral, etc.

According to another embodiment, in which a countermeasure comprises generating noise on a power supply or clock bus, the signal is a signal parameterizing the noise level or percentage.

Other signals may be processed according to the applications and the countermeasures envisaged.

Figure 2:
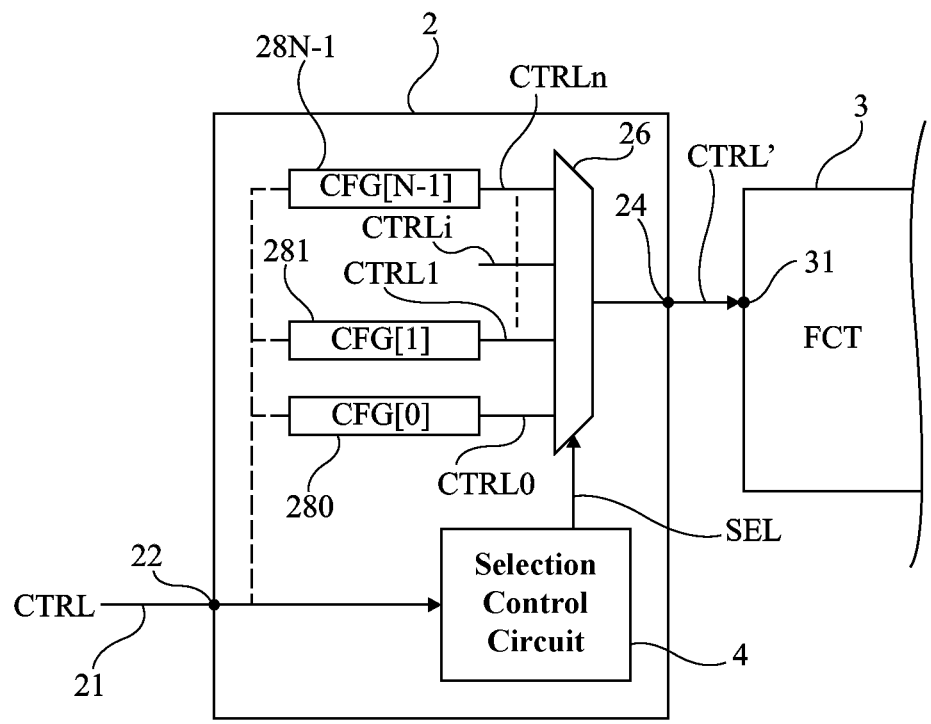
FIG. 2 represents, very schematically and in the form of blocks, an embodiment of protection circuitry to protect, for example, the circuit in FIG. 1.

FIG. 2 represents, very schematically and in the form of blocks, an embodiment of a protection module or circuitry to protect a circuit, such as the circuit in FIG. 1.

The protection module or circuitry 2 intercepts a configuration signal CTRL carried by one or more conductors 21. The signal CTRL may be analog or digital. In the absence of the module or circuitry 2, the conductor or conductors 21 are connected to one or more terminals 31 of a functional circuit 3 (FCT) controlled by the signal CTRL. Here, the conductor or conductors 21 are connected to one or more input terminals 22 of the module or circuitry 2, and a replacement or modified signal CTRL' is supplied by one or more output terminals 24 of the module or circuitry 2, connected to the input terminal or terminals 31. The module or circuitry 2 comprises a selection control circuit 4 controlling a selector 26 (e.g., multiplexer) supplying the signal CTRL' selected from among multiple (N) configuration signals CTRLi (e.g., i between 0 and N−1) applied to the N inputs of the selector 26. The signals CTRLi may be generated directly by the circuit 2, e.g., when it involves configuration words contained in registers 28 (280—CFG[0], 281—CFG[1], 28i—CFG[i], 28N−1—CFG[N−1]), or correspond to different processing applied to the signal CTRL (dotted line connection in FIG. 2), or various combinations thereof. For example, the processing may be a direct modification of the period of a clock signal.

The role of the selection control circuit 4 is to generate a control signal SEL of the multiplexer 26 in order to regularly change the rank i of the signal CTRLi selected as the configuration signal CTRL'. The change is, in an embodiment, non-periodic, e.g., the circuit 4 modifies the rank i non-periodically. The duration, during which a configuration is maintained, may be random or correspond to stored durations different for each configuration, where applicable combined with a random or non-random mask.

Figure 3:
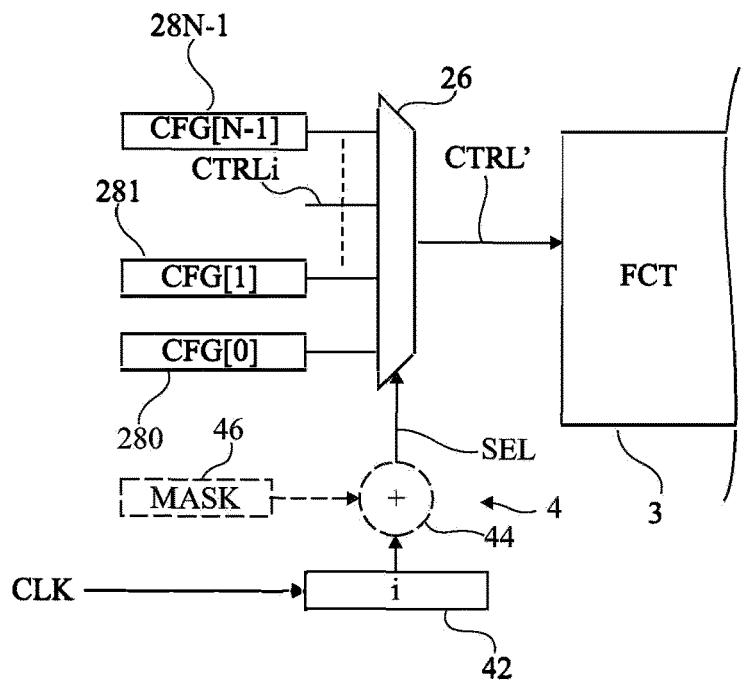
FIG. 3 represents, in more detail, an embodiment of protection circuitry.

FIG. 3 represents, in more detail, an embodiment of a protection module or circuit, here a desynchronization module, for desynchronizing the operations of the function to be protected.

The circuit 4 comprises a circuit 42 for selecting the rank i of the configuration CFG[i] to be applied. In this example, this circuit 4 receives an unscrambled clock or sequencing signal CLK. The circuit 4 also comprises, in an embodiment, an combining circuit or element 44 to combine (typically an Exclusive-OR or bitwise addition) the rank i supplied by the circuit 42 with a mask MASK, e.g., randomly selected, stored in a register 46. The elements 44 and 46 are represented by a dotted line to emphasize their optional character. The result of the combining supplies the selection signal SEL of the configuration CFG to be selected by the selector 26 (e.g., one of 280 to 28N).

According to this example, the output signal CTRL' of the selector 26 is a configuration word of a sequencing or clock signal of the functional circuit 3, e.g., of the processing unit 11 of the circuit 1. The configuration word is, for example, a percentage of variation of the period of the clock signal CLK.

Figure 4:
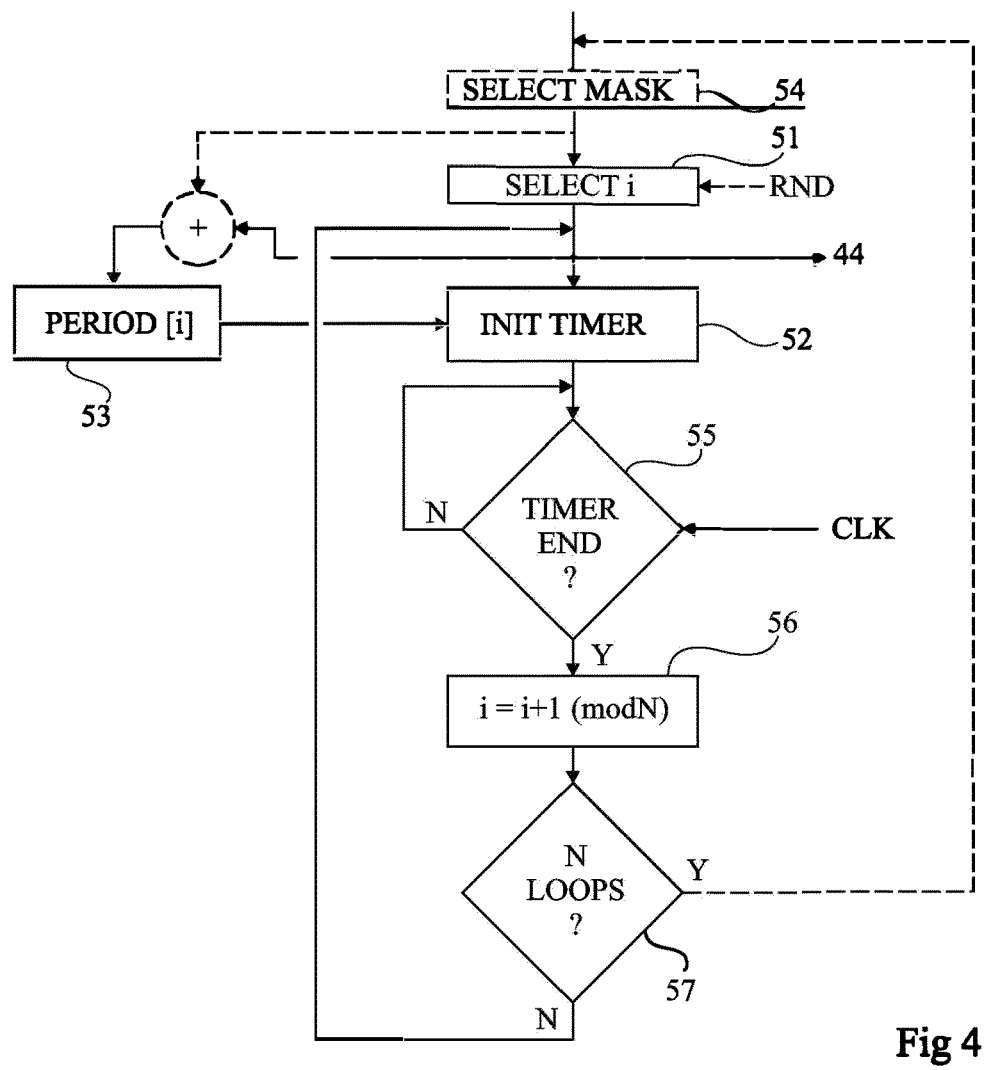
FIG. 4 is a simplified block diagram illustrating the operation of the embodiment in FIG. 3.

FIG. 4 is a simplified block diagram illustrating the operation of an embodiment of the circuit 42 in FIG. 3.

In an embodiment, the rank i supplied to the selector 26 or to the combiner 44 is regularly (e.g., based on varying durations of time) modified.

At 51, a value for the rank i is selected (block 51, SELECT i). This selection from the set of the N possible values for the rank i may be performed by taking the first value (i=0), or by random selection on the basis of a random number RND.

The selected rank i is supplied to the selector 26 or to the combiner 44 and a time counter (timer) is initialized (block 52, INIT TIMER). In an embodiment, the time counter sets the application duration of the rank i, e.g., the application duration of the configuration CFG[i] to the functional circuit 3. The value of the counter may be different for each rank i. For example, a table of values of the different durations may be stored in memory and the duration PERIOD[i] read (block 53) in this table during the selection. This duration PERIOD[i] parameterizes the time counter 52.

In one embodiment, each period is assigned to a configuration. In this case, the set of ranks (configuration plus period) may be scanned in an order made random by the application of a mask (the mask MASK). For this (dotted line in FIG. 4), a mask is generated or selected (block 54, SELECT MASK), e.g., a random number, and it is added (Exclusive-OR combining) to the rank i supplied in the table 53 for selecting the period or application duration PERIOD [i+MASK] of the configuration CFG[i+MASK].

For example at the clock CLK rate (or with another periodicity) it is checked (block 55, TIMER END ?) whether the threshold of the time counter is reached. When this is the case (output Y of block 55), the value of the rank i is incremented, e.g., modulo N (block 56, i=i+1 (mod N)). The new value becomes the value supplied to the combiner 44 and there is a return to step 52 of initialization of the time counter. Otherwise (output N of block 55), the current configuration is retained.

In the case where a mask MASK is used, the number of loops performed, e.g., the number of uses of the mask MASK, may be tested (block 57, N LOOPs ?). Once the same mask has been used N times (output Y of block 57), e.g., has served for all the values of i, there is a return to block 54 for selecting another mask.

Thus, the N configurations CFG[i] are applied in turn with different application durations.

In another embodiment, the periods and configurations are selected independently, e.g., by two different masks. In this case, the application duration of the same configuration changes each time whenever the mask is different.

It should be noted that, even with a circuit 4 provided for applying a scrambling mask, the configurations may be scanned sequentially. It suffices to force this mask to zero and the configurations are then always scanned in the same order. If it is no longer wished to scramble or protect the function, the selection loop may be stopped, for example, and the same configuration is applied continuously, or the same configuration placed in all the registers 28.

An advantage of embodiments is that they may facilitate masking the operation of a function of a circuit.

Another advantage of an embodiment is that the solution described is compatible with protecting erasure and write durations of a flash memory.

Various embodiments have been described. Various variants and modifications will be apparent to the person skilled in the art. Finally, the practical implementation of the embodiments that have been described is within the scope of the person skilled in the art from the functional details given above. Furthermore, although the above description uses a vocabulary corresponding to a hardware implementation, a software embodiment is possible.

In an embodiment, a method comprises: protecting functional circuitry of an integrated circuit against attacks by hidden channels, the protecting including controlling operation of the functional circuitry over successive periods of time, by, for each successive period of time: selecting a configuration of the functional circuitry from a set of configurations of the functional circuitry; setting a duration of the period of time; and applying the selected configuration of the functional circuitry for the set duration of the period of time. In an embodiment, the method comprises sequentially selecting configurations of the functional circuitry from the set of configurations of the functional circuitry. In an embodiment, the method comprises randomly selecting configurations of the functional circuitry from the set of configurations of the functional circuitry. In an embodiment, the method comprises: selecting a mask of a set of masks; and combining the selected mask with a configuration selection index to select a current configuration of the set of configurations. In an embodiment, the method comprises: responding to an indication that all of the configurations of the set of configurations have been selected as a current configuration using the selected mask by selecting another mask from the set of masks. In an embodiment, the method comprises: setting a current duration based on the selected mask. In an embodiment, the set of configurations has a number of configurations and a current duration is selected from a set of durations having a number of durations equal to the number of configurations. In an embodiment, the protecting functional circuitry of the integrated circuit comprises varying power consumption of the functional circuitry. In an embodiment, the applying the selected configuration comprises clocking the functional circuitry at a determined clock rate. In an embodiment, the applying the selected configuration comprises controlling a sequence of operations of the functional circuitry. In an embodiment, the setting the duration of the period of time comprises changing a duration with each selection of a configuration.

In an embodiment, an integrated circuit comprises: one or more terminals; and protection circuitry, coupled to the one or more terminals, wherein the protection circuitry, in operation, for each of a series of successive periods of time: selects a configuration of functional circuitry from a set of configurations of the functional circuitry; sets a duration of the period of time; and outputs one or more control signals via at least one of the one or more terminals to apply the selected configuration of the functional circuitry for the set duration of the period of time. In an embodiment, the integrated circuit comprises: the functional circuitry, wherein the functional circuitry is coupled to the at least one of the one or more terminals, and the functional circuitry, in operation, performs one of more functions of the integrated circuit. In an embodiment, the protection circuitry comprises: a multiplexer, which, in operation, outputs one or more control signals to the functional circuitry via the at least one of the one or more terminals based on one or more selection signals; and a control circuit, which, in operation, generates the one or more selection signals based on the selected configuration. In an embodiment, the integrated circuit comprises: a memory, which, in operation, stores information related to a set of durations of time, wherein the protection circuitry, in operation, selects a duration to apply to a selected configuration based on the stored information. In an embodiment, the stored information is a table storing the set of durations of time and a number of durations of time in the set of durations of time is equal to a number of configurations of the set of configurations. In an embodiment, the protection circuitry comprises one or more registers storing configuration information related to configurations of the functional circuitry. In an embodiment, the protection circuitry is in a control signal path of the functional circuitry. In an embodiment, in operation, power consumption of the functional circuitry varies in accordance with the selected configuration. In an embodiment, in operation, the applying the selected configuration comprises clocking the functional circuitry at a determined clock rate. In an embodiment, the applying the selected configuration comprises controlling a sequence of operations of the functional circuitry. In an embodiment, the functional circuitry comprises one or more of: a processing core of the integrated circuit; a memory of the integrated circuit; cryptographic circuitry; and an interface of the integrated circuit. In an embodiment, the setting the duration of the period of time comprises changing a duration with each selection of a configuration.

In an embodiment, a system comprises: functional circuitry, which, in operation, performs one or more system functions; and protection circuitry, coupled to the functional circuitry, wherein the protection circuitry, in operation, for each of a series of successive periods of time: selects a configuration of the functional circuitry from a set of configurations of the functional circuitry; sets a duration of the period of time; and applies the selected configuration of the functional circuitry for the set duration of the period of time. In an embodiment, the system comprises: a memory, which, in operation, stores information related to a set of durations of time, wherein the protection circuitry, in operation, selects a duration to apply to a selected configuration based on the stored information. In an embodiment, the setting the duration of the period of time comprises changing a duration with each selection of a configuration. In an embodiment, the functional circuitry comprises one or more of: a system processing core; a system memory; cryptographic circuitry; and an interface.

In an embodiment, a non-transitory computer-readable medium's contents cause protection circuitry of an integrated circuit to perform a method of protecting functional circuitry of the integrated circuit against attacks by hidden channels, the method comprising, for each of a series of successive periods of time: selecting a configuration of the functional circuitry from a set of configurations of the functional circuitry; setting a duration of the period of time; and applying the selected configuration of the functional circuitry for the set duration of the period of time. In an embodiment, the method comprises sequentially selecting configurations of the functional circuitry from the set of configurations of the functional circuitry. In an embodiment, the setting the duration of the period of time comprises changing a duration with each selection of a configuration.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
protecting functional circuitry of an integrated circuit against attacks by hidden channels, the protecting including controlling operation of the functional circuitry over successive periods of time, by, for each successive period of time:
selecting a configuration of the functional circuitry from a set of configurations of the functional circuitry;
setting a duration of the period of time; and
applying the selected configuration of the functional circuitry for the set duration of the period of time.

2. The method as claimed in claim 1, comprising sequentially selecting configurations of the functional circuitry from the set of configurations of the functional circuitry.

3. The method as claimed in claim 1, comprising randomly selecting configurations of the functional circuitry from the set of configurations of the functional circuitry.

4. The method as claimed in claim 3, comprising:
selecting a mask of a set of masks; and
combining the selected mask with a configuration selection index to select a current configuration of the set of configurations.

5. The method as claimed in claim 4, comprising:
responding to an indication that all of the configurations of the set of configurations have been selected as a current configuration using the selected mask by selecting another mask from the set of masks.

6. The method as claimed in claim 4, comprising:
setting a current duration based on the selected mask.

7. The method of claim 1 wherein the set of configurations has a number of configurations and a current duration is selected from a set of durations having a number of durations equal to the number of configurations.

8. The method of claim 1 wherein the protecting functional circuitry of the integrated circuit comprises varying power consumption of the functional circuitry.

9. The method of claim 1 wherein the applying the selected configuration comprises clocking the functional circuitry at a determined clock rate.

10. The method of claim 1 wherein the applying the selected configuration comprises controlling a sequence of operations of the functional circuitry.

11. The method of claim 1 wherein the setting the duration of the period of time comprises changing a duration with each selection of a configuration.

12. The method of claim 1, wherein selecting the configuration comprises randomly selecting a mask, combining the selected mask with a selection signal and selecting the configuration based on the combination of the selected mask with the selection signal.

13. An integrated circuit, comprising:
one or more terminals; and
protection circuitry, coupled to the one or more terminals, wherein the protection circuitry, in operation, for each of a series of successive periods of time:
selects a configuration of functional circuitry from a set of configurations of the functional circuitry;
sets a duration of the period of time; and
outputs one or more control signals via at least one of the one or more terminals to apply the selected configuration of the functional circuitry for the set duration of the period of time.

14. The integrated circuit of claim 13, wherein the integrated circuit includes the functional circuitry, the functional circuitry is coupled to the at least one of the one or more terminals, and the functional circuitry, in operation, performs one of more functions of the integrated circuit.

15. The integrated circuit of claim 13 wherein the protection circuitry comprises:
a multiplexer, which, in operation, outputs one or more control signals to the functional circuitry via the at least one of the one or more terminals based on one or more selection signals; and
a control circuit, which, in operation, generates the one or more selection signals based on the selected configuration.

16. The integrated circuit of claim 13, comprising:
a memory, which, in operation, stores information related to a set of durations of time, wherein the protection circuitry, in operation, selects a duration to apply to a selected configuration based on the stored information.

17. The integrated circuit of claim 16 wherein the stored information is a table storing the set of durations of time and a number of durations of time in the set of durations of time is equal to a number of configurations of the set of configurations.

18. The integrated circuit of claim 13 wherein the protection circuitry comprises one or more registers storing configuration information related to configurations of the functional circuitry.

19. The integrated circuit of claim 13 wherein the protection circuitry is in a control signal path of the functional circuitry.

20. The integrated circuit of claim 13 wherein, in operation, power consumption of the functional circuitry varies in accordance with the selected configuration.

21. The integrated circuit of claim 13 wherein, in operation, the applying the selected configuration comprises clocking the functional circuitry at a determined clock rate.

22. The integrated circuit of claim 13 wherein the applying the selected configuration comprises controlling a sequence of operations of the functional circuitry.

23. The integrated circuit of claim 14 wherein the functional circuitry comprises one or more of:
a processing core of the integrated circuit;
a memory of the integrated circuit;
cryptographic circuitry; and
an interface of the integrated circuit.

24. The integrated circuit of claim 13 wherein the setting the duration of the period of time comprises changing a duration with each selection of a configuration.

25. The device of claim 13 wherein the protection circuitry, in operation, randomly selects a mask, combines the selected mask with a selection signal and selects the configuration based on the combination of the selected mask with the selection signal.

26. A system, comprising:
functional circuitry, which, in operation, performs one or more system functions; and
protection circuitry, coupled to the functional circuitry, wherein the protection circuitry, in operation, for each of a series of successive periods of time:
selects a configuration of the functional circuitry from a set of configurations of the functional circuitry;
sets a duration of the period of time; and
applies the selected configuration of the functional circuitry for the set duration of the period of time.

27. The system of claim 26, comprising:
a memory, which, in operation, stores information related to a set of durations of time, wherein the protection circuitry, in operation, selects a duration to apply to a selected configuration based on the stored information.

28. The system of claim 26 wherein the setting the duration of the period of time comprises changing a duration with each selection of a configuration.

29. The system of claim 26 wherein the functional circuitry comprises one or more of:
a system processing core;
a system memory;
cryptographic circuitry; and
an interface.

30. The system of claim 26 wherein the protection circuitry, in operation, randomly selects a mask, combines the selected mask with a selection signal and selects the configuration based on the combination of the selected mask with the selection signal.

31. A non-transitory computer-readable medium having contents which cause protection circuitry of an integrated circuit to perform a method of protecting functional circuitry of the integrated circuit against attacks by hidden channels, the method comprising, for each of a series of successive periods of time:
selecting a configuration of the functional circuitry from a set of configurations of the functional circuitry;
setting a duration of the period of time; and
applying the selected configuration of the functional circuitry for the set duration of the period of time.

32. The non-transitory computer-readable medium of claim 31 wherein the method comprises sequentially selecting configurations of the functional circuitry from the set of configurations of the functional circuitry.

33. The non-transitory computer-readable medium of claim 31 wherein the setting the duration of the period of time comprises changing a duration with each selection of a configuration.

34. The non-transitory computer-readable medium of claim 31 wherein the method comprises randomly selecting a mask, combining the selected mask with a selection signal and selecting the configuration based on the combination of the selected mask with the selection signal.

* * * * *